US012591956B2

(12) United States Patent (10) Patent No.: US 12,591,956 B2
Bode et al. (45) Date of Patent: Mar. 31, 2026

(54) NOISE REDUCTION AND FEATURE ENHANCEMENT FOR A THERMAL IMAGING CAMERA

(71) Applicant: Seek Thermal, Inc., Goleta, CA (US)

(72) Inventors: Daniel Bode, Santa Barbara, CA (US); Brian Nehring, Santa Barbara, CA (US); Sofia Hamrin, Santa Barbara, CA (US); William J. Parrish, Santa Barbara, CA (US)

(73) Assignee: Seek Thermal, Inc., Goleta, CA (US)

( * ) Notice: Subject to any disclaimer, the term of this patent is extended or adjusted under 35 U.S.C. 154(b) by 255 days.

(21) Appl. No.: 18/337,219

(22) Filed: Jun. 19, 2023

(65) Prior Publication Data

US 2023/0410262 A1 Dec. 21, 2023

Related U.S. Application Data

(60) Provisional application No. 63/373,984, filed on Aug. 30, 2022, provisional application No. 63/369,747, (Continued)

(51) Int. Cl.
*G06T 5/00* (2024.01)
*G01J 5/48* (2022.01)
(Continued)

(52) U.S. Cl.
CPC ................. *G06T 5/70* (2024.01); *G01J 5/48* (2013.01); *G06T 5/20* (2013.01); *G06T 5/40* (2013.01);
(Continued)

(58) Field of Classification Search
CPC .... G06T 5/70; G06T 5/20; G06T 5/40; G06T 7/11; G06T 7/13; G06T 2207/10024; G06V 10/56; G01J 5/48
(Continued)

(56) References Cited

U.S. PATENT DOCUMENTS 6,055,340 A 4/2000 Nagao
6,628,842 B1 9/2003 Nagao
(Continued)

FOREIGN PATENT DOCUMENTS

CN 110 570 374 A 12/2019
WO WO 2014/107120 A1 7/2014
(Continued)

OTHER PUBLICATIONS

International Search Report and Written Opinion issued in PCT Application No. PCT/US2023/068673, dated Nov. 28, 2023, in 33 pages.

(Continued)

*Primary Examiner* — Allen H Nguyen
(74) *Attorney, Agent, or Firm* — Knobbe, Martens, Olson & Bear LLP

(57) ABSTRACT

Thermal cameras, particularly less elaborate inexpensive designs, may deliver high temperature resolution at the expense of less clear displayed images. For many low visibility uses, such as firefighting, it may be advantageous to sacrifice some temperature detail for clarity and object recognition. Without sacrificing the actual detailed temperature information available in a captured scene, it may be beneficial to apply filters in series to raw image data that reduce visible noise and build back in feature contrast for the purposes of providing a user a displayed image that permits ease of object recognition, while still providing the raw data to a thermography module to maintain high resolution of temperature information if desired. In addition, more efficient and useful edge highlighting techniques are disclosed. For very low contrast scenes, such as smoky rooms and the like, other specific filters and equalization methods may be applied.

16 Claims, 18 Drawing Sheets

Related U.S. Application Data filed on Jul. 28, 2022, provisional application No. 63/366,687, filed on Jun. 20, 2022.

(51) Int. Cl.

| | |
|---|---|
| *G06T 5/20* | (2006.01) |
| *G06T 5/40* | (2006.01) |
| *G06T 5/70* | (2024.01) |
| *G06T 7/11* | (2017.01) |
| *G06T 7/13* | (2017.01) |
| *G06V 10/56* | (2022.01) |

(52) U.S. Cl.
CPC .................. *G06T 7/11* (2017.01); *G06T 7/13* (2017.01); *G06V 10/56* (2022.01); *G06T 2207/10024* (2013.01)

(58) Field of Classification Search
USPC .......................................................... 382/263
See application file for complete search history.

(56) References Cited

U.S. PATENT DOCUMENTS

| | | | |
|---|---|---|---|
| 6,849,849 | B1 | 2/2005 | Warner et al. |
| 8,340,414 | B2 | 12/2012 | Hogasten et al. |
| 8,428,385 | B2 | 4/2013 | Whiteside et al. |
| 8,515,196 | B1 | 8/2013 | Högasten |
| 8,836,793 | B1 | 9/2014 | Kriesel et al. |
| 9,215,384 | B2 | 12/2015 | Högasten et al. |
| 9,471,970 | B2 | 10/2016 | Strandmar |
| 9,549,130 | B2 | 1/2017 | Lee |
| 9,595,087 | B2 | 3/2017 | Olsson |
| 9,875,556 | B2 | 1/2018 | McNally |
| 9,924,116 | B2 | 3/2018 | Chahine et al. |
| 9,947,086 | B2 | 4/2018 | Lee et al. |
| 10,249,032 | B2 | 4/2019 | Strandemar |
| 10,255,662 | B2 | 4/2019 | Olsson |
| 10,298,859 | B2 | 5/2019 | Frost et al. |
| 10,542,193 | B1 | 1/2020 | Marteney et al. |
| 10,600,164 | B2 * | 3/2020 | Lee ......................... H04N 25/76 |
| 11,276,152 | B2 | 3/2022 | Wolfe et al. |
| 11,375,166 | B2 | 6/2022 | Paul et al. |
| 2010/0111412 | A1 | 5/2010 | Hogasten et al. |
| 2014/0355904 | A1 | 12/2014 | Olsson |
| 2015/0124102 | A1 | 5/2015 | Frost et al. |
| 2016/0070125 | A1 | 3/2016 | Reich et al. |
| 2016/0156858 | A1 | 6/2016 | Lee et al. |
| 2016/0198102 | A1 | 7/2016 | Chahine et al. |
| 2016/0323525 | A1 | 11/2016 | Lee |
| 2017/0004609 | A1 | 1/2017 | Strandemar |
| 2017/0053380 | A1 | 2/2017 | McNally |
| 2017/0186139 | A1 | 6/2017 | Olsson |
| 2018/0348143 | A1 | 12/2018 | Ahlstrom et al. |
| 2020/0099825 | A1 | 3/2020 | Marteney et al. |
| 2020/0200608 | A1 * | 6/2020 | Williams .................. G01J 5/70 |
| 2020/0380651 | A1 * | 12/2020 | Wolfe ........................ G06T 5/92 |
| 2021/0201476 | A1 * | 7/2021 | Prasad ................... G06T 7/521 |
| 2022/0094896 | A1 | 3/2022 | Paul et al. |
| 2022/0201239 | A1 * | 6/2022 | Price ..................... H04N 9/646 |
| 2023/0410263 | A1 * | 12/2023 | Bode ..................... H04N 23/81 |

FOREIGN PATENT DOCUMENTS

| | | |
|---|---|---|
| WO | WO 2016/022374 A1 | 2/2016 |
| WO | WO 2019/028067 A1 | 2/2019 |

OTHER PUBLICATIONS

Guillon S. et al.: "Adaptive nonlinear filters for 2D and 3D image enhancement", Signal Processing, Elsevier, Amsterdam, NL, vol. 67, No. 3, Jun. 30, 1998 (Jun. 30, 1998), pp. 237-254, XP004129654, ISSN: 0165-1684, DOI: 10.1016/S0165-1684(98)00042-5 equation (33); figures 3, 5.

Paris Sylvain et al.: "Bilateral Filtering: Theory and Applications", Foundations and Trends in Computer Graphics and Vision, vol. 4, No. 1, Jan. 1, 2008 (Jan. 1, 2008), pp. 1-75, XP055822578, US ISSN: 1572-2740, DOI: 10.1561/0600000020 section 2, equations (3) & (4); figure 2.1.

\* cited by examiner

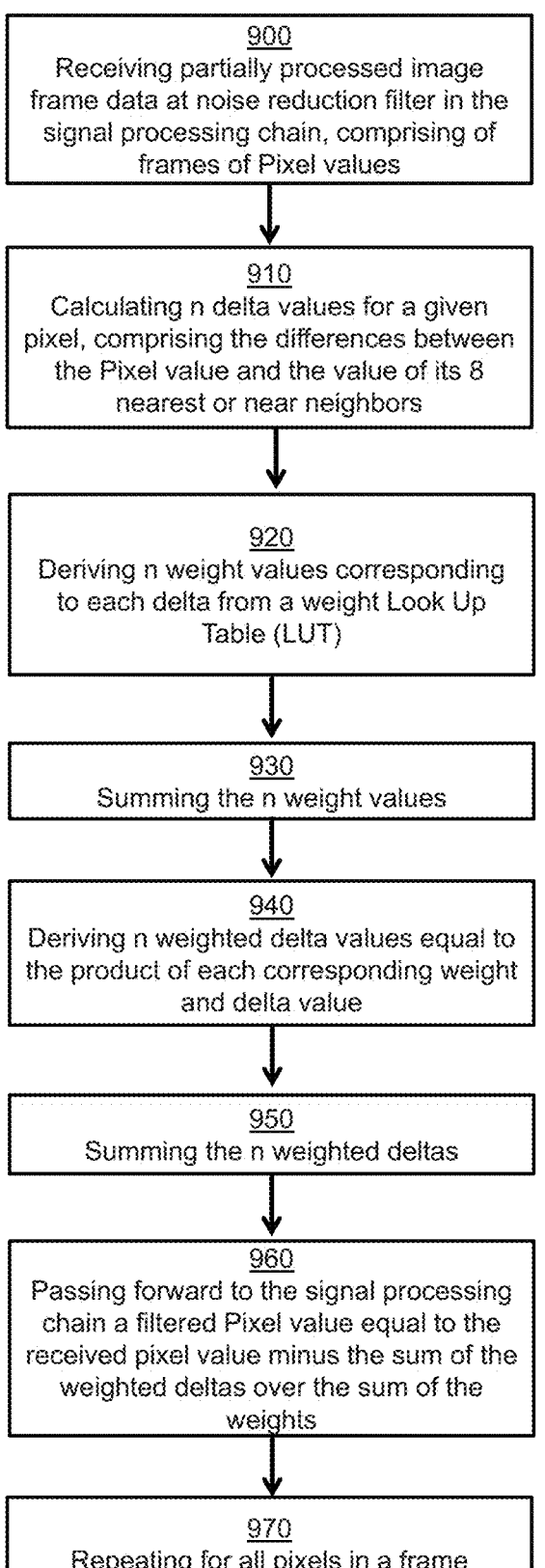

900
Receiving partially processed image frame data at noise reduction filter in the signal processing chain, comprising of frames of Pixel values

910
Calculating n delta values for a given pixel, comprising the differences between the Pixel value and the value of its 8 nearest or near neighbors

920
Deriving n weight values corresponding to each delta from a weight Look Up Table (LUT)

930
Summing the n weight values

940
Deriving n weighted delta values equal to the product of each corresponding weight and delta value

950
Summing the n weighted deltas

960
Passing forward to the signal processing chain a filtered Pixel value equal to the received pixel value minus the sum of the weighted deltas over the sum of the weights

970
Repeating for all pixels in a frame

*FIG. 9*

Edge Filter

Edge Strength
Distribution

Edge Strength
Distribution
Bins

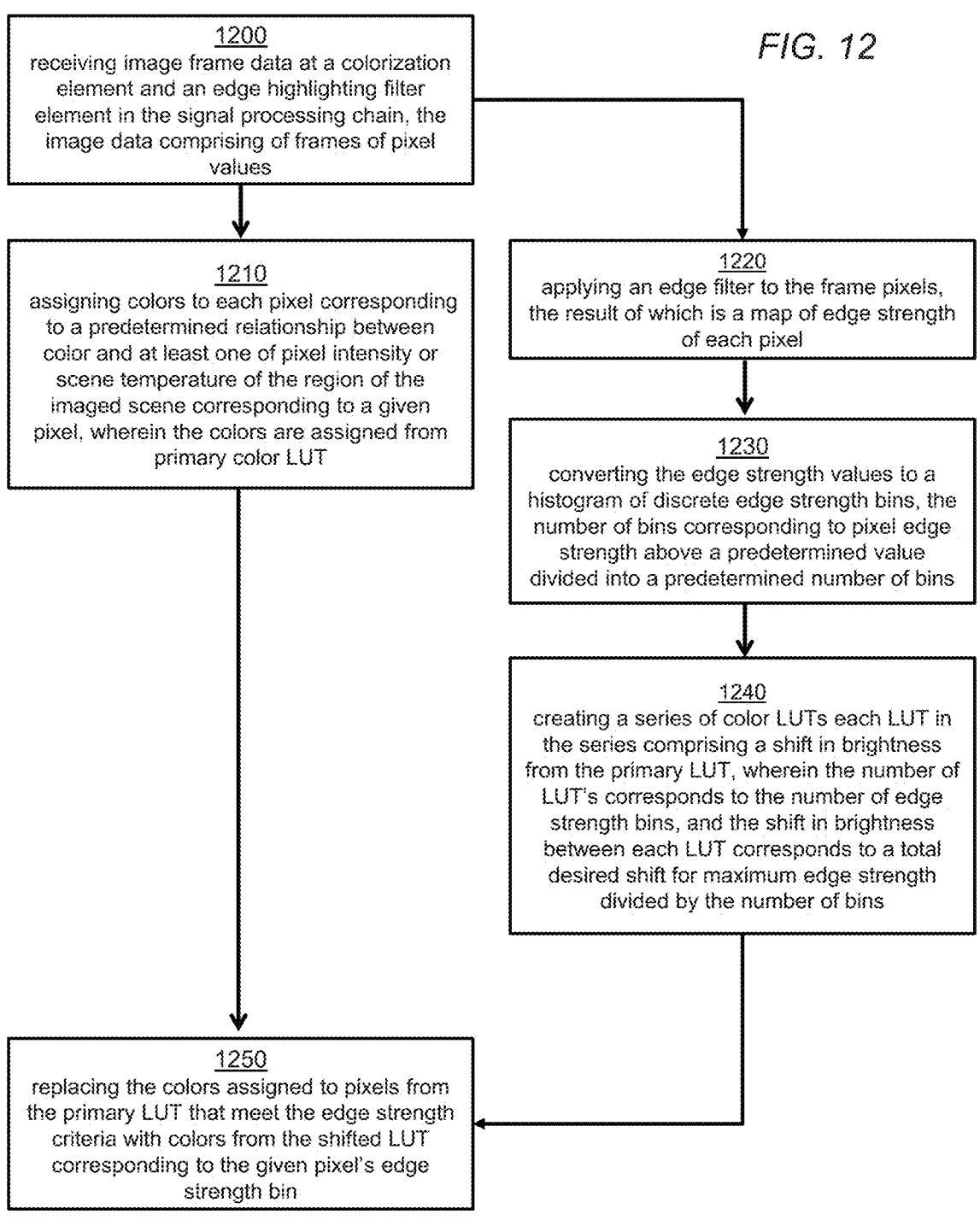

FIG. 12

1200
receiving image frame data at a colorization element and an edge highlighting filter element in the signal processing chain, the image data comprising of frames of pixel values 1210
assigning colors to each pixel corresponding to a predetermined relationship between color and at least one of pixel intensity or scene temperature of the region of the imaged scene corresponding to a given pixel, wherein the colors are assigned from primary color LUT 1220
applying an edge filter to the frame pixels, the result of which is a map of edge strength of each pixel 1230
converting the edge strength values to a histogram of discrete edge strength bins, the number of bins corresponding to pixel edge strength above a predetermined value divided into a predetermined number of bins 1240
creating a series of color LUTs each LUT in the series comprising a shift in brightness from the primary LUT, wherein the number of LUT's corresponds to the number of edge strength bins, and the shift in brightness between each LUT corresponds to a total desired shift for maximum edge strength divided by the number of bins 1250
replacing the colors assigned to pixels from the primary LUT that meet the edge strength criteria with colors from the shifted LUT corresponding to the given pixel's edge strength bin

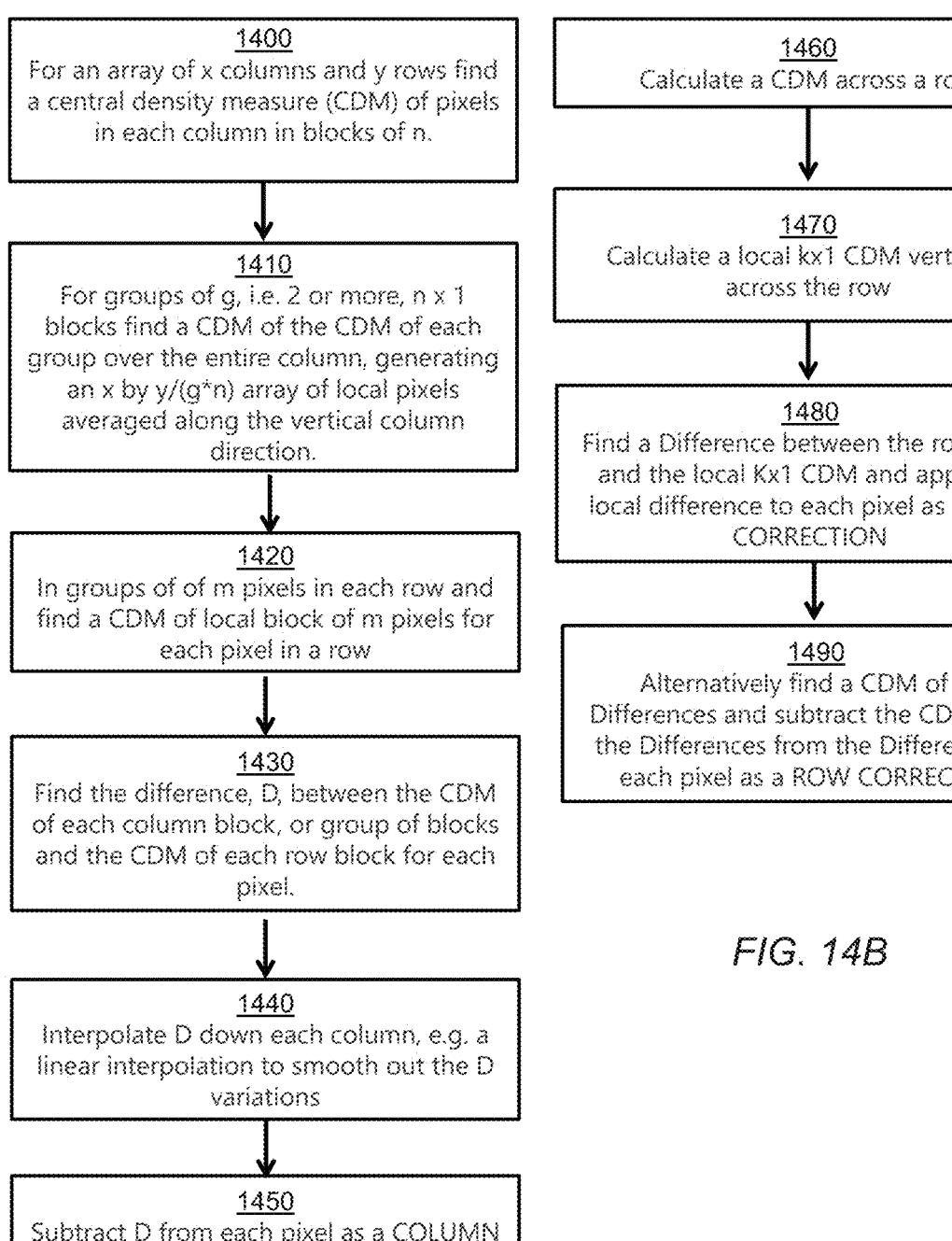

1400
For an array of x columns and y rows find a central density measure (CDM) of pixels in each column in blocks of n.

1410
For groups of g, i.e. 2 or more, n x 1 blocks find a CDM of the CDM of each group over the entire column, generating an x by y/(g*n) array of local pixels averaged along the vertical column direction.

1420
In groups of of m pixels in each row and find a CDM of local block of m pixels for each pixel in a row

1430
Find the difference, D, between the CDM of each column block, or group of blocks and the CDM of each row block for each pixel.

1440
Interpolate D down each column, e.g. a linear interpolation to smooth out the D variations

1450
Subtract D from each pixel as a COLUMN CORRECTION:

*FIG. 14A*

1460
Calculate a CDM across a row

1470
Calculate a local kx1 CDM vertically across the row

1480
Find a Difference between the row CDM and the local Kx1 CDM and apply the local difference to each pixel as a ROW CORRECTION

1490
Alternatively find a CDM of the Differences and subtract the CDM of of the Differences from the Differences to each pixel as a ROW CORRECTION

*FIG. 14B*

$$\Sigma W_n * \Delta_n = \Sigma_{weighted\_delta}$$

NOISE REDUCTION AND FEATURE ENHANCEMENT FOR A THERMAL IMAGING CAMERA

CROSS-REFERENCE TO RELATED APPLICATIONS

This application claims the benefit of U.S. Provisional Application Ser. No. 63/373,984, filed Aug. 30, 2022, U.S. Provisional Application Ser. No. 63/369,747, filed Jul. 28, 2022, and U.S. Provisional Application Ser. No. 63/366,687, filed Jun. 20, 2022, all of which are incorporated by reference herein in their entirety.

FIELD

The present disclosure generally relates to thermal cameras, and in particular to thermal cameras used in applications requiring image clarity.

BACKGROUND

The increasing availability of high-performance, low-cost uncooled thermal imaging devices, such as those based on bolometer focal plane arrays (FPAs), is enabling the design and production of mass-produced thermal imaging cameras. In applications such as firefighting and other reduced visibility uses it would be beneficial for thermal camera modules intended for such uses to have modes of operation where image clarity is enhanced.

SUMMARY

The devices and methods of this disclosure each have several innovative aspects, no single one of which is solely responsible for its desirable attributes. Without limiting the scope as expressed by the claims that follow, its more prominent features will now be discussed briefly.

Thermal cameras, particularly less elaborate inexpensive designs, may deliver high temperature resolution at the expense of less clear displayed images. For many low visibility uses, such as firefighting, it may be advantageous to sacrifice some temperature detail for clarity and object recognition. Without sacrificing the actual detailed temperature information available in a captured scene, it may be beneficial to apply filters in series that reduce visible noise and build back in feature contrast for the purposes of providing a user a displayed image that permits ease of object recognition, while still providing the raw data to a thermography module to maintain high resolution of temperature information if desired. In addition, more efficient and useful edge highlighting techniques are disclosed. For low or very low contrast scenes, such as smoky rooms and the like, other specific filters and equalization methods may be applied.

In a first aspect, a method may be described for reducing noise in a thermal image in a thermal camera including a thermal imaging sensor, and image processing capability for implementing a signal processing chain of processor executed functions. The method includes receiving partially processed image frame data at a noise reduction filter in the signal processing chain, the partially processed image frame data comprising frames of pixel values; and, for each pixel of a plurality of pixels of the frame: calculating n delta values for the pixel, each of the delta values comprising a difference between the pixel value of the pixel and the pixel value of a near or nearest neighbor pixel; deriving, based on a weight look up table (LUT), n weight values each corresponding to one of then delta values; summing then weight values; deriving n weighted delta values each equal to a product of the corresponding weight and delta values; summing the n weighted delta values; and passing forward to the signal processing chain a filtered pixel value equal to the received pixel value for the pixel minus a quotient of the sum of the n weighted delta values divided by the sum of the n weight values.

In some embodiments, the weight LUT contains discrete values of a function that yields diminished weight for increasing delta values. In some embodiments, the function is a gaussian curve centered at a delta of zero. In some embodiments, the method further includes determining a contrast of the scene based on a width of a histogram of the image intensity values of at least one of all or a subset of all pixels in an image frame of the scene; and varying a width of the gaussian curve depending on the width of the histogram.

In some embodiments, the method further includes, for each of the plurality of pixels: applying a low pass filter (LPF) to the pixel to generate a LPF pixel value; subtracting the LPF pixel value from the received pixel value of the pixel; applying a high pass filter (HPF) to the LPF pixel value to generate a HPF pixel value; applying a variable gain to the HPF pixel value according to a gain LUT; adding the LPF pixel value to the pixel value derived from the gain LUT to derive a feature enhanced pixel value; and passing forward the feature enhanced pixel value to the signal processing chain. In some embodiments, the gain LUT boosts pixel values with values a predetermined threshold above or below zero and leaves pixel values unchanged if the pixels are within the predetermined threshold of zero.

In some embodiments, the feature enhancement filter follows the noise reduction filter in the signal processing chain.

In a second aspect, a method may be described for enhancing features in a thermal image in a thermal camera including a thermal imaging sensor, and image processing capability for implementing a signal processing chain of processor executed functions. The method includes receiving a frame of partially processed image frame data comprising pixel values at a feature enhancement filter in the signal processing chain; and, for each pixel of a plurality of pixels of the frame: applying a low pass filter (LPF) to the pixel to generate a LPF pixel value; subtracting the LPF pixel value from the received pixel value of the pixel; applying a high pass filter (HPF) to the LPF pixel value to generate a HPF pixel value; applying a variable gain to the HPF pixel value according to a gain LUT; adding the LPF pixel value to the pixel value derived from the gain LUT to derive a feature enhanced pixel value; and passing forward the feature enhanced pixel value to the signal processing chain.

In some embodiments, the gain LUT boosts pixel values with values a predetermined threshold above or below zero and leaves pixel values unchanged if the pixels are within the predetermined threshold of zero.

In some embodiments, the method further includes, for each pixel of the plurality of pixels: calculating n delta values for the pixel, each of the delta values comprising a difference between the pixel value of the pixel and the pixel value of a near or nearest neighbor pixel; deriving n weight values corresponding to each delta from a weight look up table (LUT); summing the n weight values; deriving n weighted delta values each equal to a product of the corresponding weight and delta values; summing the n weighted delta values; and passing forward to the signal processing chain a filtered pixel value equal to the received pixel value for the pixel minus a quotient of the sum of the n weighted delta values divided by the sum of the n weight values.

In some embodiments, the weight LUT contains discrete values of a function that yields diminished weight for increasing delta values. In some embodiments, the function is a gaussian curve centered at a delta of zero. In some embodiments, the method further includes determining a contrast of the scene based on a width of a histogram of the image intensity values at least one of all or a subset of pixels in an image frame of the scene; and varying a sigma of the gaussian depending on predetermined values of the contrast. In some embodiments, the method further includes determining a contrast of the scene based on a width of a histogram of the image intensity values of at least one of all or a subset of all pixels in an image frame of the scene; and varying a width of the gain LUT depending on predetermined values of the contrast.

In some embodiments, the feature enhancement filter follows the noise reduction filter in the signal processing chain.

In some embodiments, the method further includes receiving image frame data at a colorization element and an edge highlighting filter element in the signal processing chain, the image data comprising frames of pixel values; assigning colors to each pixel corresponding to a predetermined relationship between color and at least one of pixel intensity or scene temperature of the region of the imaged scene corresponding to a given pixel, wherein the colors are assigned from a primary color look up table (LUT); applying an edge filter to the frame pixels to generate a map of edge strength values of each pixel; converting the edge strength values to a histogram of discrete edge strength bins comprising a number of edge strength bins corresponding to pixel edge strength above a predetermined value divided into a predetermined number of bins; creating a series of color LUTs each color LUT in the series comprising a shift in brightness from the primary color LUT, wherein the number of color LUTs corresponds to the predetermined number of bins, and the shift in brightness between each color LUT corresponds to a total desired shift for maximum edge strength divided by the predetermined number of bins; and replacing the colors assigned to individual pixels from the primary color LUT that have a pixel edge strength above the predetermined value, with colors from the shifted LUT corresponding to the individual pixel's edge strength bin.

In a third aspect, a method may be described for improving image contrast for low contrast imaged scene. The method includes determining the contrast of the scene by the width of a histogram of the image intensity values of all or a subset of all pixels in an image frame of the scene; and varying the linearity of the equalization applied to the pixel values to be more linear the narrower the width of the intensity histogram.

In a fourth aspect, a column noise correction filter method may be described for a digital image frame of input pixel values arranged in a series of rows and columns. The method includes, for each column of the image frame: dividing pixels of the column into blocks of n pixels; creating a first measure of central tendency for each block; grouping each block with m adjacent blocks from adjacent columns; creating a second measure of central tendency of the first central tendency values for each m block grouping; and subtracting the second measure of central tendency from the first measure of central tendency to create a column noise correction value which is subtracted from each corresponding input pixel to create a column noise filtered image frame.

In some embodiments, the row noise correction values is further interpolated between adjacent rows before being applied.

In some embodiments, the first measure is an average, and the second measure is a median.

In some embodiments, the blocks are chosen to overlap.

In some embodiments, n=one of 8 or 16, and m=5.

In some embodiments, the method further includes determining a contrast of the scene based on a width of a histogram of the image intensity values of at least one of all or a subset of pixels in an image frame of the scene and applying column filter steps to columns if the contrast is below a predetermined value.

In a fifth aspect, a row noise correction filter method may be described for a digital image frame of input pixel values. The method includes, for each row of the image frame: creating a first measure of central tendency to the row of all the pixels in the row; dividing the row into blocks of k pixels; creating a second measure of central tendency of the pixels in each block; subtracting, for each block, the second measure of central tendency from the first measure of central tendency to create an intermediate correction factor; creating a third measure based on the intermediate correction factors; creating a row noise correction factor comprising a difference between the intermediate product and the third measure; and subtracting the row noise correction value from each corresponding input pixels to create a row noise filtered image.

In some embodiments, the first measure is mean, the second measure is median, and the third measure is mean.

In some embodiments, k=7.

In some embodiments, the method further includes determining a contrast of the scene based on a width of a histogram of the image intensity values of at least one of all or a subset of pixels in an image frame of the scene and applying row filter steps to columns if the contrast is below a predetermined value.

In a sixth aspect, a method may be described for highlighting edge features in a thermal image in a thermal camera including a thermal imaging sensor, and image processing capability for implementing a signal processing chain of processor executed functions. The method includes: receiving image frame data at a colorization element and an edge highlighting filter element in the signal processing chain, the image data comprising frames of pixel values; assigning colors to each pixel corresponding to a predetermined relationship between color and at least one of pixel intensity or scene temperature of the region of the imaged scene corresponding to a given pixel, wherein the colors are assigned from a primary color look up table (LUT); applying an edge filter to the frame pixels to generate a map of edge strength values of each pixel; converting the edge strength values to a histogram of discrete edge strength bins comprising a number of edge strength bins corresponding to pixel edge strength above a predetermined value divided into a predetermined number of bins; creating a series of color LUTs each color LUT in the series comprising a shift in brightness from the primary color LUT, wherein the number of color LUTs corresponds to the predetermined number of bins, and the shift in brightness between each color LUT corresponds to a total desired shift for maximum edge strength divided by the predetermined number of bins; and replacing the colors assigned to individual pixels from the primary color LUT that have a pixel edge strength above the predetermined value, with colors from the shifted LUT corresponding to the individual pixel's edge strength bin.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations are merely examples and are not intended to be limiting. Throughout the drawings, similar symbols typically identify similar components, unless context dictates otherwise.

FIGS. 9 and 10 show flow charts of exemplary filter methods.

FIG. 12 shows a flow chart of an exemplary edge highlighting method.

FIGS. 14A and 14B show the steps for particular embodiments of the filters of FIG. 13.

DETAILED DESCRIPTION

The following description is directed to certain implementations for the purpose of describing the innovative aspects of this disclosure. However, a person having ordinary skill in the art will readily recognize that the teachings herein can be applied in a multitude of different ways.

Generally described, embodiments of the present disclosure relate to improving image clarity of displayed images for a thermal camera. In general, raw image data from a thermal camera consists of frames of pixels, wherein the raw pixel data for each pixel is a digital value directly related to the temperature of the corresponding region of the imaged scene. As such, the raw data may be optimized to provide as high-resolution temperature differentiation as is possible given the signal detection and signal degradation characteristics of the camera imaging system.

When the thermal image data is displayed to a user, fine temperature resolution may not always lead to clarity in displaying visible objects, as the temperature profile of scene elements may not exactly correspond to their physical shape and real world scenes often contain limited different temperatures. For many thermal camera applications, firefighting for example, it is useful to discriminate temperatures finely but also "see in the dark" capability is desirable to identify the location of objects in a dark and/or smoky environment.

Disclosed herein are embodiments of a thermal camera image processing architecture that addresses image clarity while maintaining high temperature resolution with a two-path signal processing chain. On one path, the signal processing chain uses raw thermal image data directly for determining the temperature corresponding a given pixel signal intensity, a process referred to as thermography. On a second path, the signal processing chain applies a series of noise reduction and contrast enhancement filters to the raw data. The second path improves the object clarity in a display of the thermal image while the first path maintains thermal resolution. Data from the two paths may be combined in a variety of ways disclosed herein.

Figure 1:
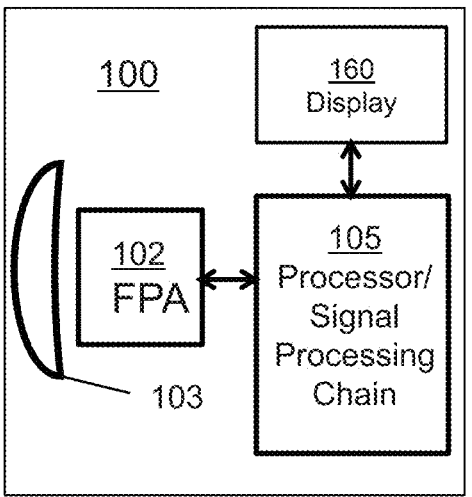
FIG. 1 shows an exemplary block diagram of the basic elements of a thermal camera.

FIG. 1 shows the general elements of a thermal camera 100. Thermal sensor 102 is often referred to as a Focal Plane Array (FPA), which usually an array of photodetectors responsive to light in the thermal spectral bands. Light is focused onto the sensor 102 by optics 103. Often included in the FPA are readout electronics which sample the photodetector pixel in a timed manner that results in the readout of digital values in successive frames of digital video data. The sensor video output is delivered to a signal processing chain 105, which usually is image processing and display formatting software executing on one or more processing and/or logic elements. The physical processing element may reside in any appropriate part of a camera system in unitary or distributed fashion. Fully processed data is often provided to a display 160 for a user. The current disclosure is mainly directed to novel elements of the signal processing chain 105.

Figure 2:
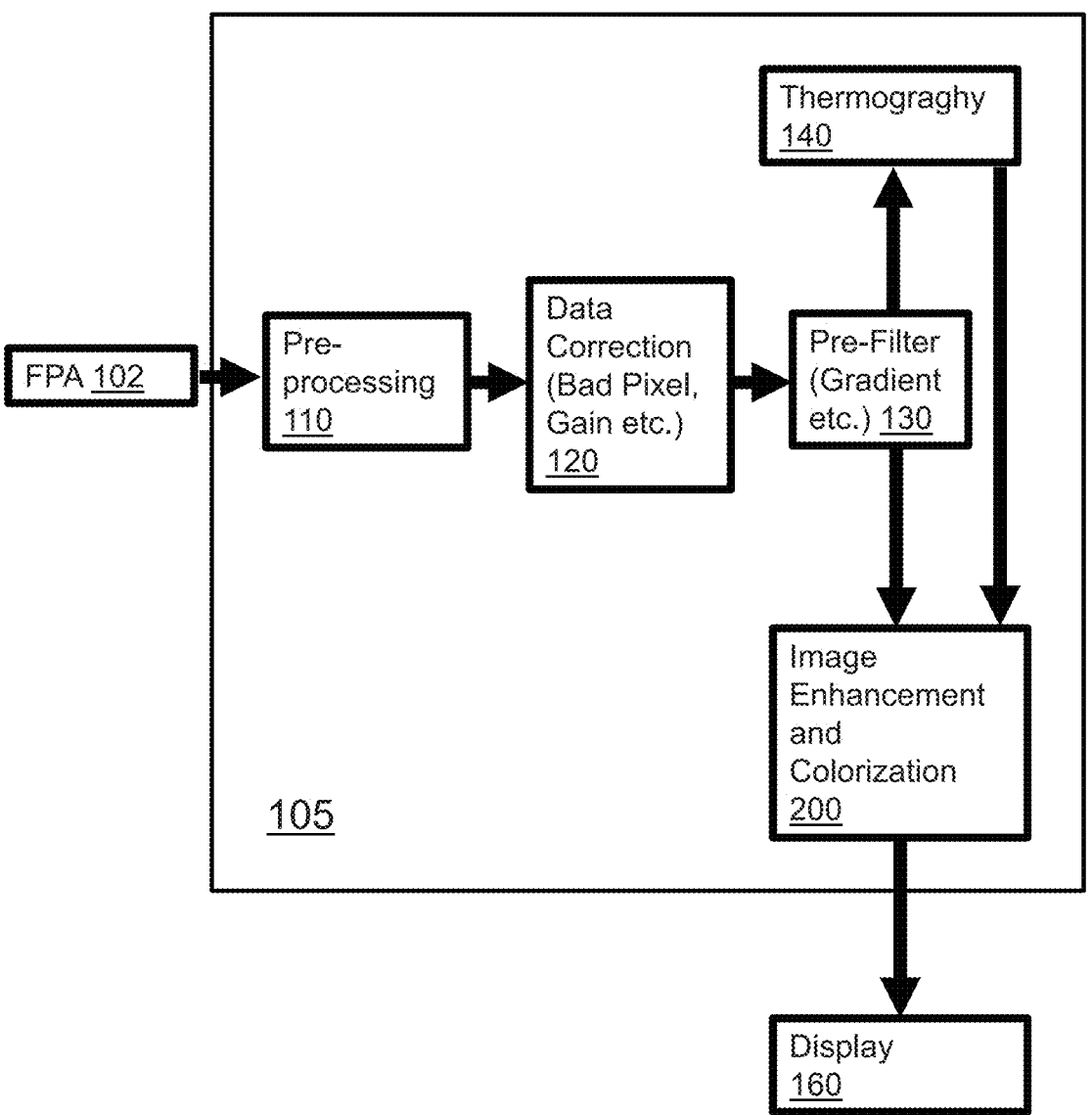
FIG. 2 shows an exemplary block diagram of parts of a signal processing chain according to some embodiments.

FIG. 2 shows elements of signal processing chain 105. Thermal sensor data from FPA 102 (particularly for inexpensive, mass-produced thermal cameras) is subject to a variety of degradation effects and usually requires significant image processing steps before it can be used. Examples of such processing includes Pre-Processing 110, which may include processes such as frame averaging and conversion to numerical formats; Data Correction 120 including processes such as bad pixel replacement and gain/offset correction; and Pre-Filters 130 such as gradient filtering or the like. These image processing steps generally do not degrade the temperature resolution as they represent corrections due to degradation effects due to the sensor and/or optics, not actually due to scene temperature variations.

After these processing steps, the signal path may bifurcate. The corrected data is sent to a Thermography module 140, which, through a variety of techniques, converts the scene temperature dependent pixel data to actual temperature of the portion of the scene corresponding to a given pixel. The corrected data may also be sent to an Image Enhancement and Colorization Module 200. The Image Enhancement and Colorization Module 200 can improve the image quality and utility of the image displayed to the user. This path will not guarantee preservation of temperature resolution, but will rather address image clarity, object recognition and color interpretation. The temperature output of the Thermography module 140 may be used by the Image Enhancement and Colorization Module 200 to incorporate high resolution temperature data with clarity enhanced data for display that provides both.

Figure 3:
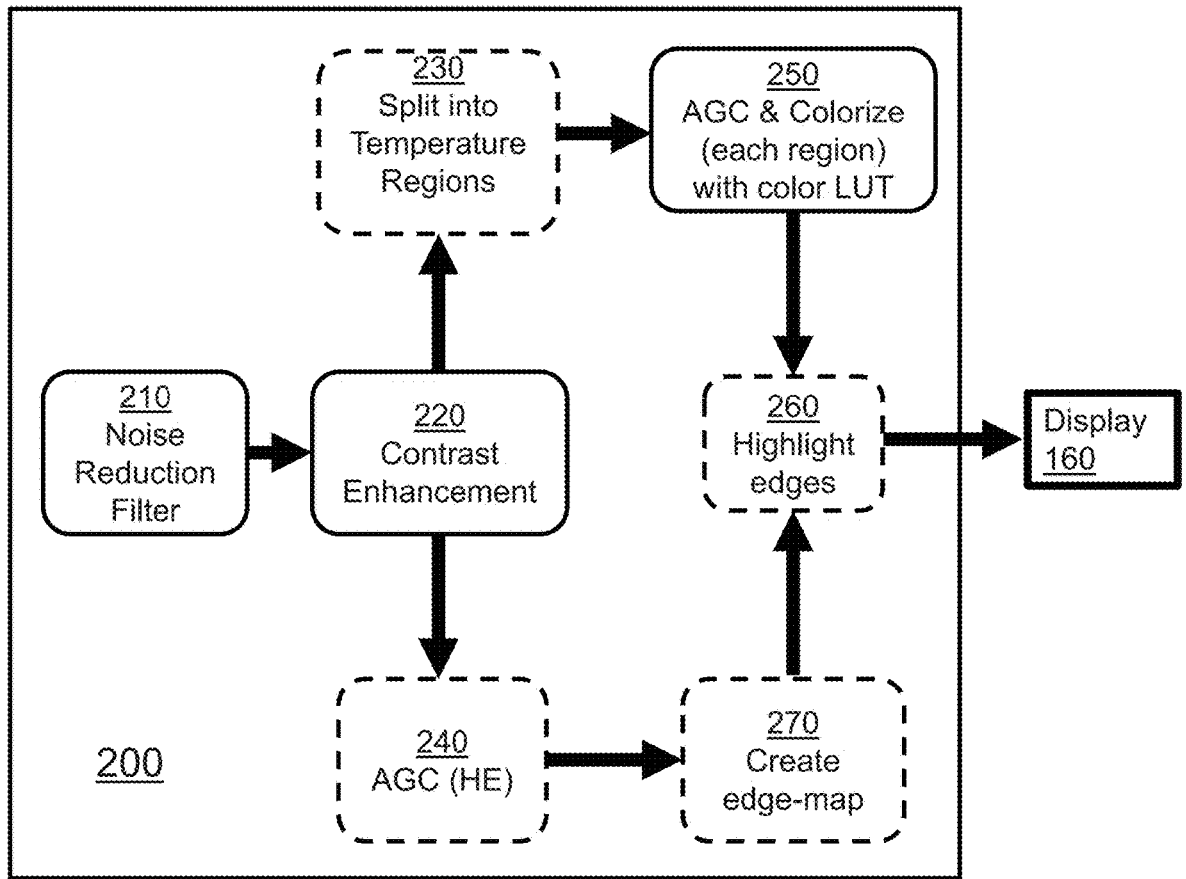
FIG. 3 shows an exemplary block diagram of parts of a signal processing chain according to some embodiments

FIG. 3 shows elements of an example Image Enhancement and Colorization Module 200. Elements 210 and 220 show functionality for a series combination of a Noise Reduction Filter and a contrast Enhancement Filter, in this case exemplified by a High Pass Filter (HPF) Look Up Table (LUT) Boost Filter. Depending on the intended use of the camera, the output of these filters may be passed directly to an AGC (e.g., Histogram Equalization (HE)) and Colorize module 250 for display 160. Alternatively, the filter output may be directed into other image enhancement modules, such as splitting scene temperatures into ranges or regions 230 for temperature selective colorization, very useful for firefighting to make dangerous temperatures clearly identifiable. Another possibility is to identify edges 240 and create an edge map 270 leading to highlighting edges 260 for display 160.

Example Noise Reduction Filter

Figure 4:
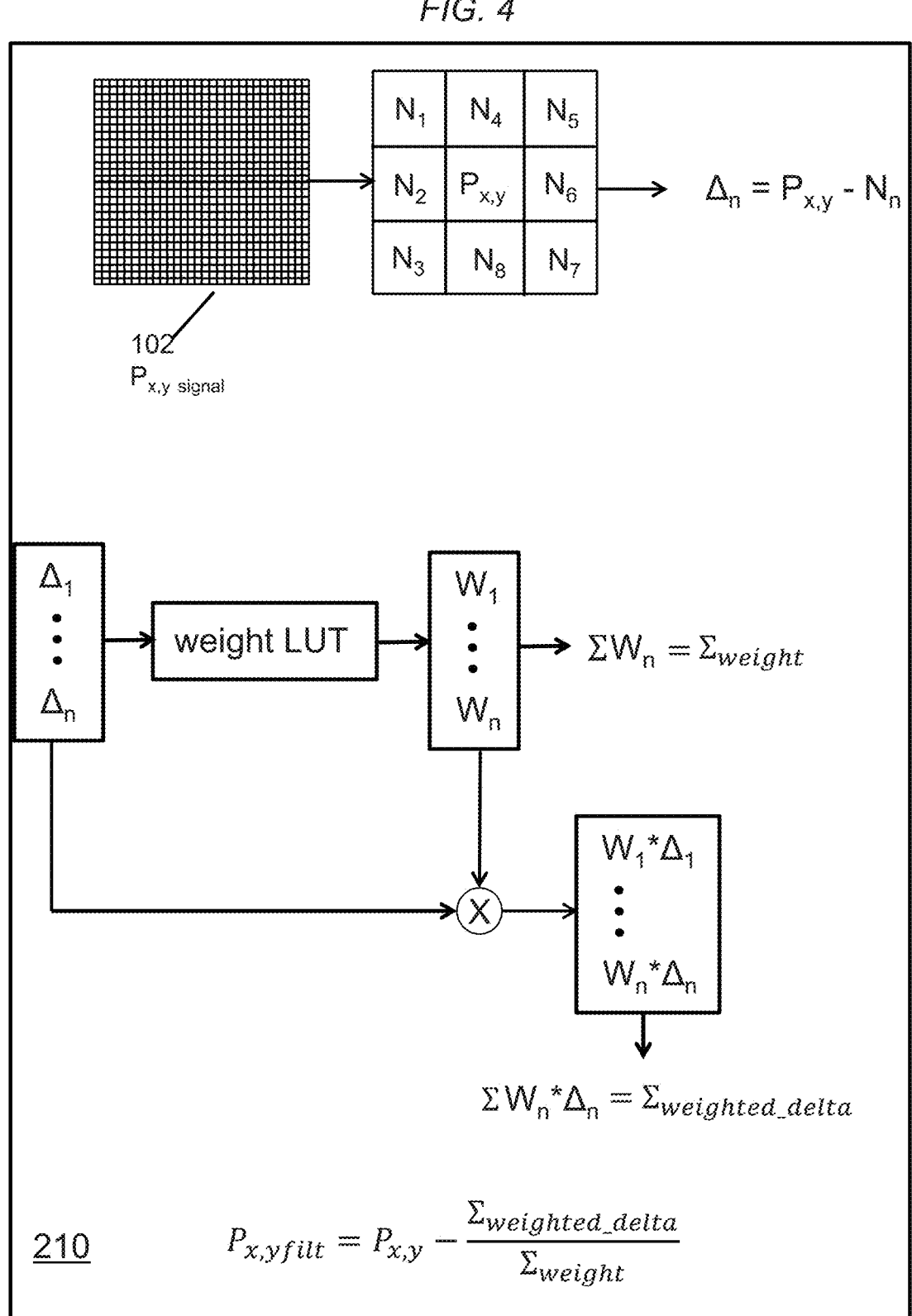
FIG. 4 shows an exemplary block diagram of a noise reduction filter according to some embodiments.

FIG. 4 illustrates an example embodiment of a noise reduction Filter. A 3×3 kernel is used by way of example but other size kernels, e.g., any X×Y kernel within reasonable size could be used. Sensor 102 provides a data stream of image values $P_{x,y}$ corresponding to each pixel of the imaging sensor. This data stream, which may as shown above already have been subject to pre-processing is passed to the Filter 210 along the signal processing chain. For each Pixel, $P_{x,y}$, a 3×3 kernel of the 8 nearest neighbor Pixel values, $N_1$ to $N_8$, is used. Eight delta values, $\Delta_n = P_{x,y} - N_n$, are calculated. The center value may also be used without subtraction, so n could be 8 or 9 for instance. These delta values are sent down a bifurcated path. On one path, eight (or 9) Weight values, $W_1$ to $W_8$, are derived from a Look Up Table (LUT). Using a LUT for deriving the weights has several advantages. First it is computationally simple, allowing for fast operation on whatever processor is executing the signal processing chain. Also, a LUT makes for a flexible design that is easily changeable, and even complex weighting functions are easy to implement and still yield results quickly.

Figure 5:
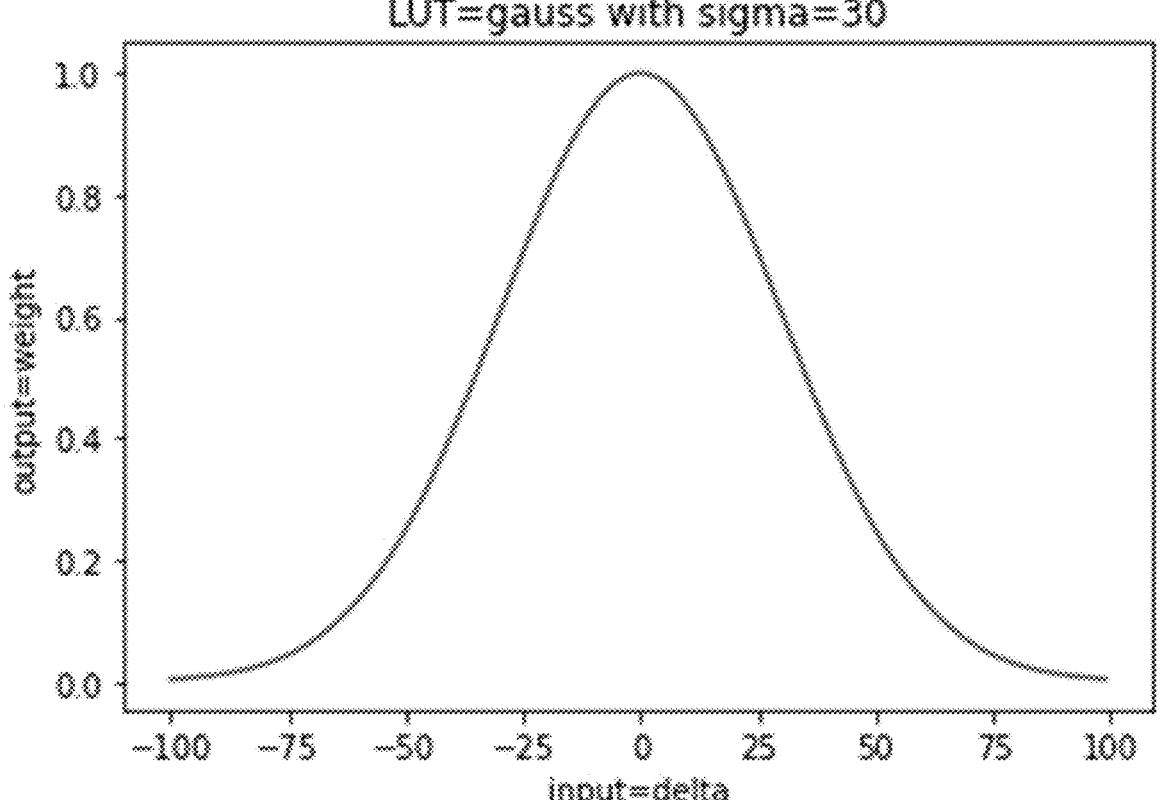
FIG. 5 shows an exemplary weight LUT according to some embodiments.

For this particular filter, the weighting function may be a center weighted function of any of various types, such as a center step function or centered Gaussian, shown in FIG. 5, which provides higher weighting to neighboring pixels closer to the value of center pixel, Px,y. The weights are summed, as shown in FIG. 4, $\Sigma_{weight} = \Sigma W_n$.

On the other path the deltas are multiplied by the weights, and the weight-delta products are summed, $\Sigma_{weighted\_delta} = \Sigma W_n * \Delta_n$.

The resultant Filtered Pixel value is $$P_{x,yfilt} = P_{x,y} - \frac{\Sigma_{weighted\_delta}}{\Sigma_{weight}}$$

Figure 6A:
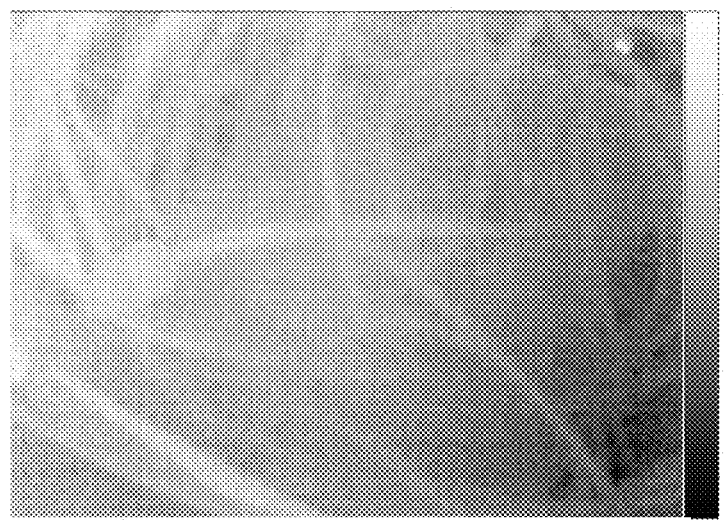
FIGS. 6A and 6B show example of images before and after the filter of FIG. 5.
Figure 6B:
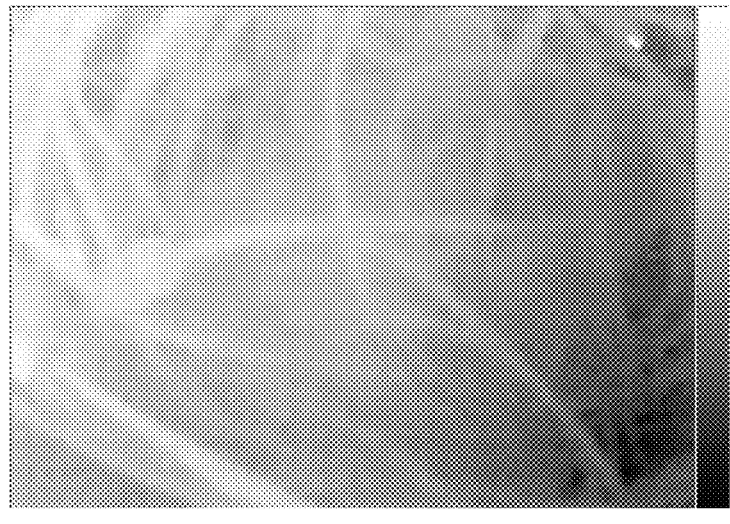

The results of which are shown in before and after filter images in FIGS. 6A and 6B, respectively. As can be seen, with a center weighted weighting function, Pixels with small deltas (noise) are suppressed while pixels with large deltas (edges) are softened. Visual clarity is much improved, however pixel value relation to temperature may be impacted. This impact is acceptable as the unfiltered data is still directly passed to the Thermography module. Larger kernels (e.g., two levels or more of nearest neighbors) and other modifications may be possible and fall withing the scope of the present disclosure. Boundary pixels may be handled in a variety of ways, such as mirroring the neighbors on the inside of the boundary to form the full kernel.

Example Contrast Enhancement Filter

Figure 7A:
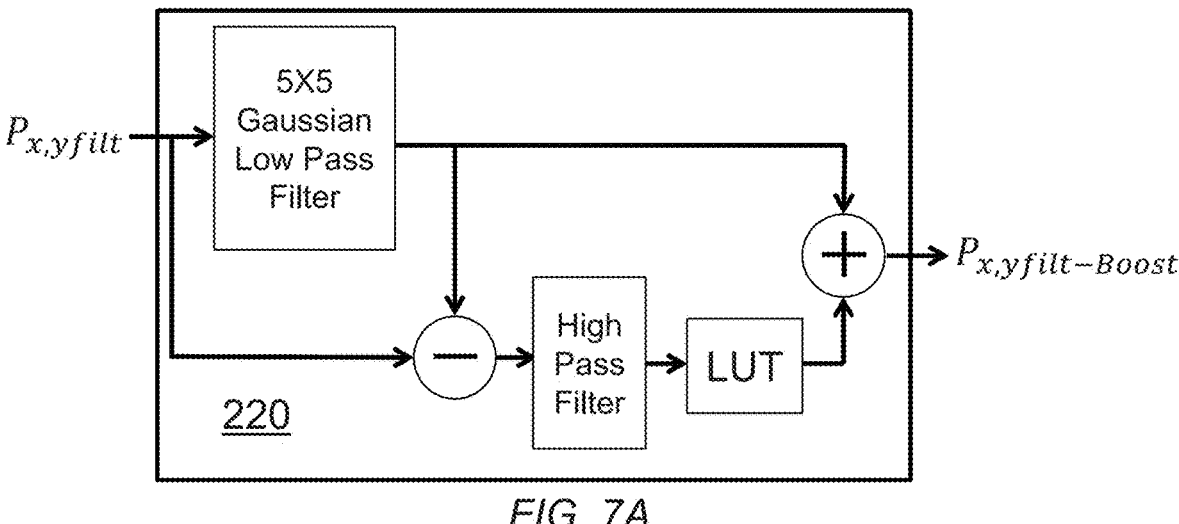
FIG. 7A shows an exemplary block diagram of a feature enhancement filter according to some embodiments.
Figure 7B:
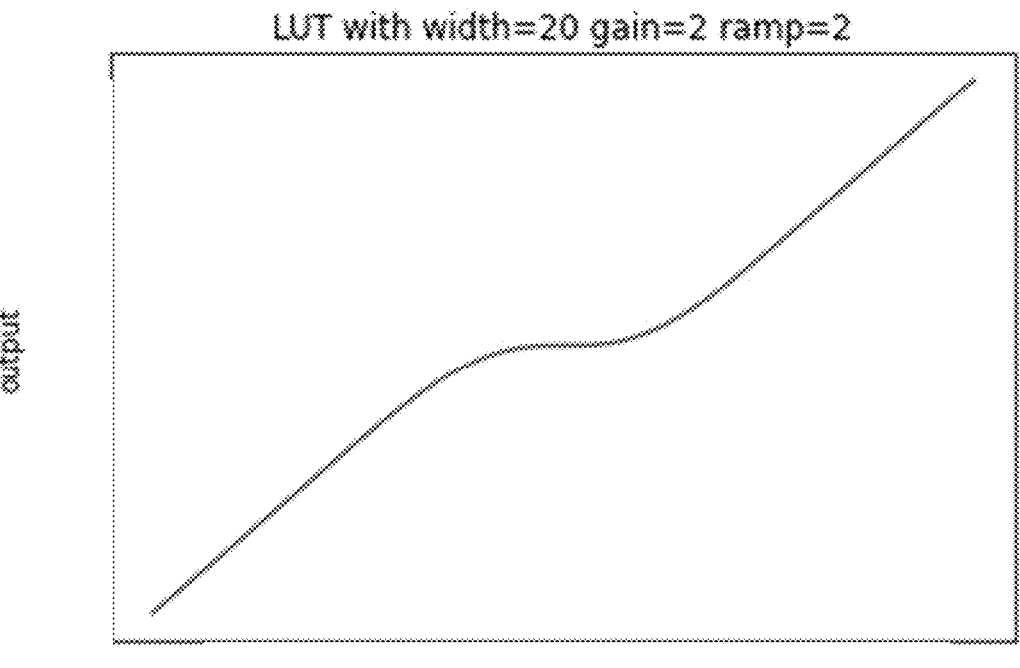
FIG. 7B shows an exemplary boost LUT according to some embodiments.

Once the image has been softened and noise reduced, it may be desirable to build back in contrast enhancement since there will be little noise left to boost in the filtered image. An embodiment of a Contrast Enhancement filter 220 is shown in FIG. 7A. Noise reduced pixels, $P_{x,yfilt}$, are passed from the noise reduction filter 210 to Contrast Enhancement filter 220. A low pass filter, (LPF) such as the 5×5 Gaussian filter shown in the figure, is applied to each pixel and then subtracted from each pixel. The result is high pass filtered and then subjected to a gain, again, derived from a LUT. An example LUT embodiment is shown in FIG. 7B. This gain function applies no gain to pixels near zero while boosting pixels outside of a determined threshold above or below zero. Thus, remaining low-contrast pixels (which may include residual noise) are suppressed and higher value pixels (image features) are boosted. Then the LPF value is added back to the boosted value to fill in the high and low spatial frequency features to the image.

Figure 8A:
FIGS. 8A and 8B show example of images before and after the filter of FIG. 7.
Figure 8B:

Before and after contrast enhancement images are shown in FIGS. 8A and 8B, respectively. Noise reduced image FIG. 8A is clean appearing but soft. This image, after contrast enhancement, is very sharp and even clearer in FIG. 8B. Thus, it can be seen the goal of maintaining scene temperature fidelity with the data path straight to thermography while creating an image more useful for "see in the dark" is accomplished. The displayed visual image may be colored or otherwise annotated with very accurate temperature data mixed with image data with a high degree of object recognition. For some uses such as firefighting, it may be especially desirable or critical to include both a high degree of object recognition and very accurate temperature data.

Example Noise Reduction Method

FIG. 9 shows a flow chart for an example embodiment of a noise reduction method.

Step 900 is receiving partially processed image frame data at the noise reduction filter in the signal processing chain, comprising of frames of Pixel values. These values may have already undergone pre-processing steps, for example, correcting faults and non-uniformities in the imaging sensor that acquires image frame data.

Step 910 is calculating n delta values for a given pixel (in this example n is 8 or 9), comprising the differences between the Pixel value and the value of its n nearest or near neighbors, and possibly using the center value as well. Other kernel sizes than 8 may be used as well.

Step 920 is deriving n weight values corresponding to each delta from a weight Look Up Table (LUT). The function represented in the LUT may be a center weighted function such as a gaussian. Using a LUT is particularly effective for both processing speed and flexibility. Step 930 is summing the 8 weight values. A weight sum value is determined.

Step 940 is deriving 8 weighted delta values equal to the product of each corresponding weight and delta value. Step 950 is summing the n weighted deltas. A weighted delta sum value is determined along with the weight sum value.

Step 960 is passing forward to the signal processing chain a filtered Pixel value equal to the received pixel value minus the sum of the weighted deltas over the sum of the weights. This is a filtered result that both softens the image and reduces image noise. Step 970 is repeating for all pixels in a frame. Pixels along the boundary of the FPA may be handled in a variety of ways as described elsewhere herein.

Example Contrast Enhancement Method

Figure 10:
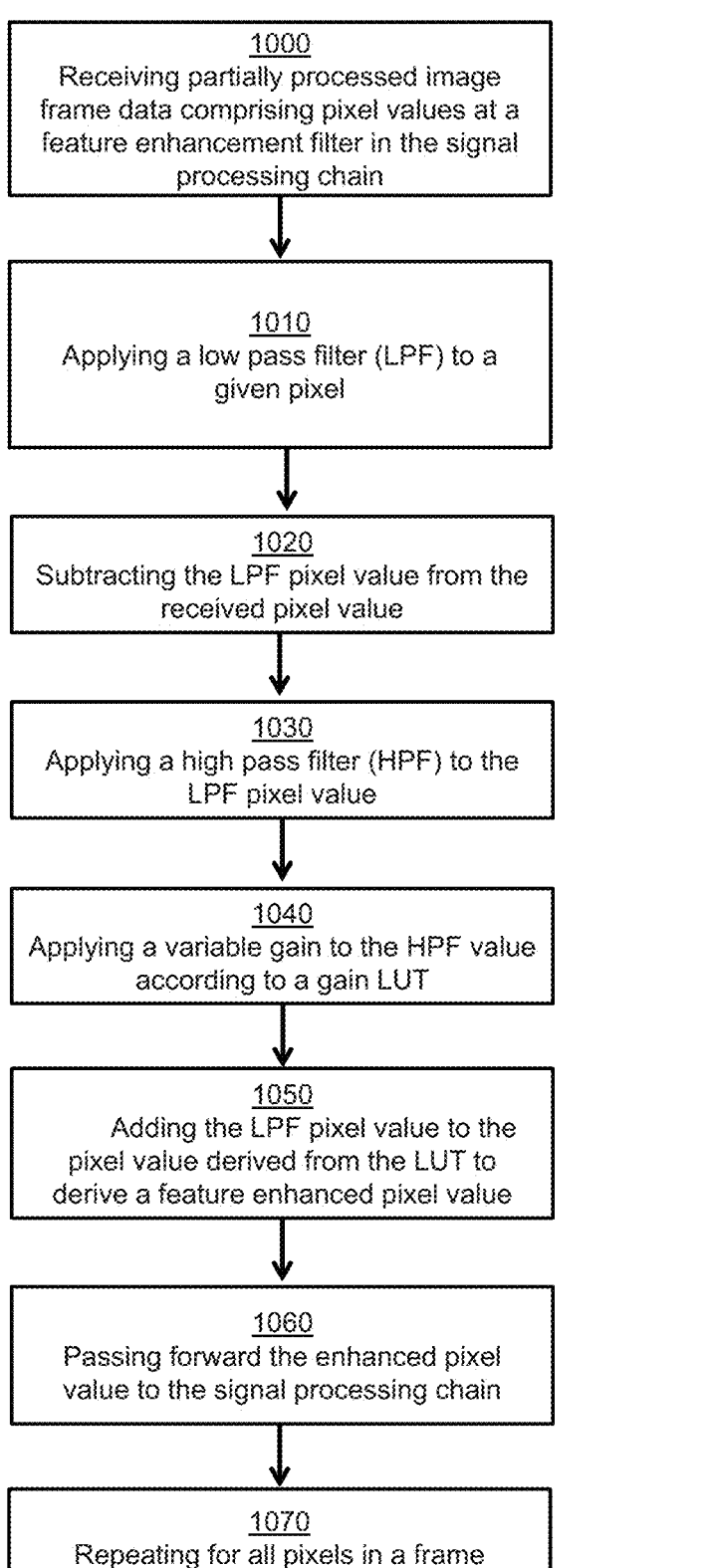

FIG. 10 shows a flow chart of an example embodiment of a contrast enhancement method.

Step 1000 is receiving partially processed image frame data comprising pixel values at a feature (contrast) enhancement filter in the signal processing chain. This may be the output of the noise reduction filter described above.

Step 1010 is applying a low pass filter (LPF) to a given pixel. Step 1020 is subtracting the LPF pixel value from the received pixel value. This step has the result of further reducing noise and enhancing sharper features such as edges.

Step 1030 is applying a high pass filter (HPF) to the LPF pixel value. This step further enhances higher spatial frequency features.

Step 1040 is applying a variable gain to the HPF value according to a gain LUT. This LUT may represent a function that applies little or no gain to Pixels near zero value (possibly noise) while boosting pixels with values outside of as threshold around zero, thereby boosting features of the imaged scene.

Step 1050 is adding the LPF pixel value to the pixel value derived from the LUT to derive a feature enhanced pixel value. This step adds back the noise reduced lower spatial frequency image data to fill in the image.

Step 1060 is passing forward the enhanced pixel value to the signal processing chain. Step 1070 is repeating for each pixel in a frame pixels along the boundary of the FPA may be handled in a variety of ways.

Edge Highlighting

For many applications, such as firefighting, it may be advantageous to further increase the visual resolution of objects in the scene. A useful technique is to highlight features in the scene corresponding to the edges of imaged objects. This can be done in a variety of ways. Edge filters (Sobel Filters, Laplace transforms, etc.) can be used to detect edge transitions in an image. Then when the image is displayed to a user, pixels detected by the filter as edges are displayed differently than non-edge pixels.

One way to do this is to simply replace edge pixel intensity values with extreme color values, such as black or white, before display. This technique creates an image with a wireframe appearance and may appear less natural to a user. It also has the disadvantage that an entire separate image frame with replaced pixel values must be carried by the signal processing chain.

Another more subtle and visually pleasing technique is to modify the luminance, e.g., by changing one or more of the color vectors such as RGB, YCV etc., of pixels corresponding to edges by applying a factor to a color vector that is dependent on the edge strength determined by the edge filter of a given pixel. This technique creates an appealing image but can be computationally intensive, slowing down the image processing speed which may be a disadvantage for some systems.

Example Edge Highlighting Technique

Figure 11:
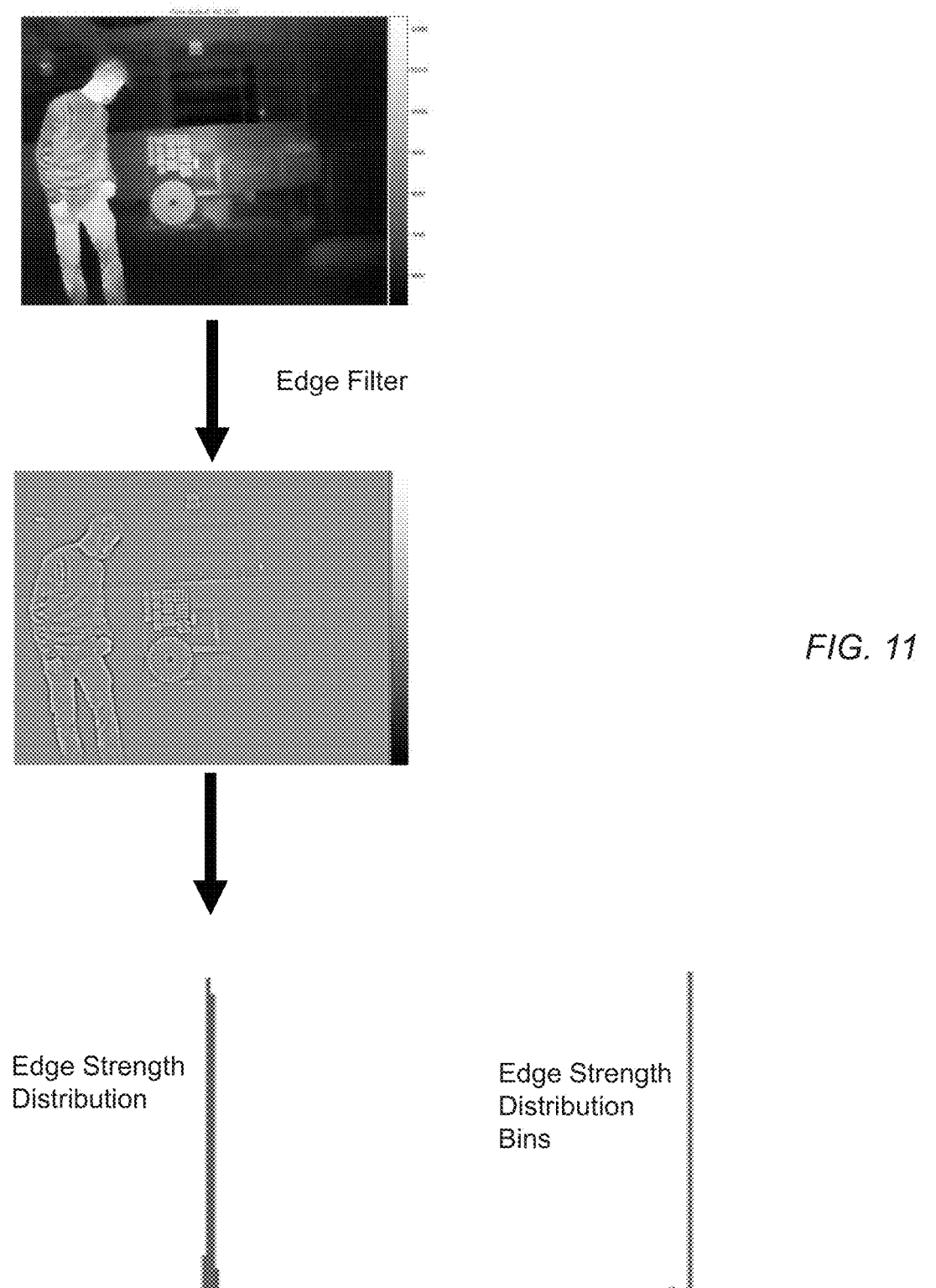
FIG. 11 illustrates examples of developing an edge strength map

An effective technique that both provides an appealing image and uses only very digital processing friendly elements has been developed in accordance with the present disclosure, elements of which are illustrated in FIG. 11.

Before display, as described above with regard to FIG. 3, the image is colorized (e.g., at block 250), often to provide an image that a use may easily determine the temperature of objects in an imaged scene by way of the color displayed. These colors are assigned to each pixel from a primary color LUT, whose colors may correspond to temperature in a variety of ways. For instance, techniques to display certain temperatures as fixed colors may be useful in application such as firefighting where dangerous temperatures must be unequivocally identified. Such color LUT assignment is described in U.S. application Ser. No. 16/051,077, filed Jul. 31, 2018, now issued as U.S. Pat. No. 10,848,725, which is incorporated by reference herein.

Returning to FIG. 11, image frames are passed to an edge filter, the output of which is a distribution of pixel edge strength, which if presented only displaying pixels above a predetermined edge strength produces an edge map image. The pixel strength distribution may be converted into discrete bins of edge strength ranges covering edge strengths determined to be high enough to merit different treatment form non-edge pixels, as shown in the figure.

A very effective way to highlight edges is to create (and usually store) a series of color LUT's related to the primary LUT, with each color value in the LUT shifted in brightness by an increment from the colors in the primary. Thus, the shifted LUT's may be brighter or darker at each color level than the primary. A useful way to do this is to create a number of shifted LUT's equal to the number of edge strength bins. The shift between each LUT may be the total amount of desired brightness range divided by the number of bins.

Then, when the image is displayed, the colors of the pixels in the identified edge bins will be assigned colors from the corresponding shifted LUT, thereby showing edges in contrasting brightness to adjacent non edge pixels, and the contrast will be dependent on edge strength of a given pixel.

Of course, the shift levels and shift numbers do not have to be evenly determined, they may be customized to address particular imager behaviors, using shift amounts that may be chosen to magnify or attenuate image properties as needed. However, the idea that edge pixels will be displayed in corresponding but shifted colors from the primary LUT yields an attractive and useful image.

Color LUTs are small, generally only 256 values for most common display systems, and they are computationally efficient as assigning LUT values to pixel them is simple memory access. Thus, the approach described above is extremely efficient computationally compared to other edge highlighting techniques.

Example Edge Highlighting Method

An example of an edge highlighting method according to the technique described above is shown in FIG. 12.

Step 1200 is receiving image frame data at a colorization element and an edge highlighting filter element in the signal processing chain, the image data comprising of frames of pixel values. Colorization elements and edge filter elements act separately on the image data, but the image processing path may merge for cases where edge highlighting is desired.

Step 1210 is assigning colors to each pixel corresponding to a predetermined relationship between color and at least one of pixel intensity or scene temperature of the region of the imaged scene corresponding to a given pixel, wherein the colors are assigned from primary color LUT. Depending on the intended use of the camera, a variety of temperature vs color allocation techniques may be used.

Step 1220 is applying an edge filter to the frame pixels, the result of which is a map of edge strength of each pixel. A distribution of pixels with differing edge strengths above a threshold is a typical outcome of this step.

Step 1230 is converting the edge strength values to a histogram of discrete edge strength bins, the number of bins corresponding to pixel edge strength above a predetermined value divided into a predetermined number of bins. This is a computationally straightforward way to break the edge strength distribution into a discrete partitioning.

Step 1240 is creating a series of color LUTs each LUT in the series comprising a shift in brightness from the primary LUT, wherein the number of LUT's corresponds to the number of edge strength bins, and the shift in brightness between each LUT corresponds to a total desired shift for maximum edge strength divided by the number of bins. For instance, in a tested implementation of this method, 32 bins and associated LUT's are used. Non-even distributions of shift amounts may also be employed to tailor the effects as needed.

Step 1250 is replacing the colors assigned to pixels from the primary LUT that meet the edge strength criteria with colors from the shifted LUT corresponding to the given pixel's edge strength bin. Color LUTs are small and replacing values is simple memory access, so this entire highlighting technique requires very little actual computation from the filter to highlighted display.

Some scenes may span very narrow temperature ranges. Examples are interior unoccupied rooms in climate-controlled buildings, or other examples, such as smoke-filled rooms where actual fire is limited or not present. Image enhancements of the types described above may not be adequate, or in some cases may actually distort the visual representation of such low contrast scenes. Other measures may be beneficial either in place of or in addition to the ones described above.

A low contrast scene for a thermal camera is a scene where the entire range of scene temperatures is small. This may be straightforward to determine, as one step in thermal image processing may be to create a histogram of the scene intensities, which corresponds to a histogram of scene temperatures, and equalizing the histogram (HE) when assigning display levels for visual display. The width of the histogram is the scene temperature range. For narrow temperature range scenes, say total histogram width less than 10 or so degrees Celsius, it may be necessary to apply special image processing techniques to maintain a high level of scene object recognition of a user.

One artifact that may be apparent in low contrast scenes is enhanced relative visibility of row-column noise, which degrades user object recognition. This low contrast scene row-column noise may be streaky, resulting in short-duration perturbations, and only be visually apparent for partial segments of rows for instance. A new, segmented row column filter may be applicable.

Figure 13:
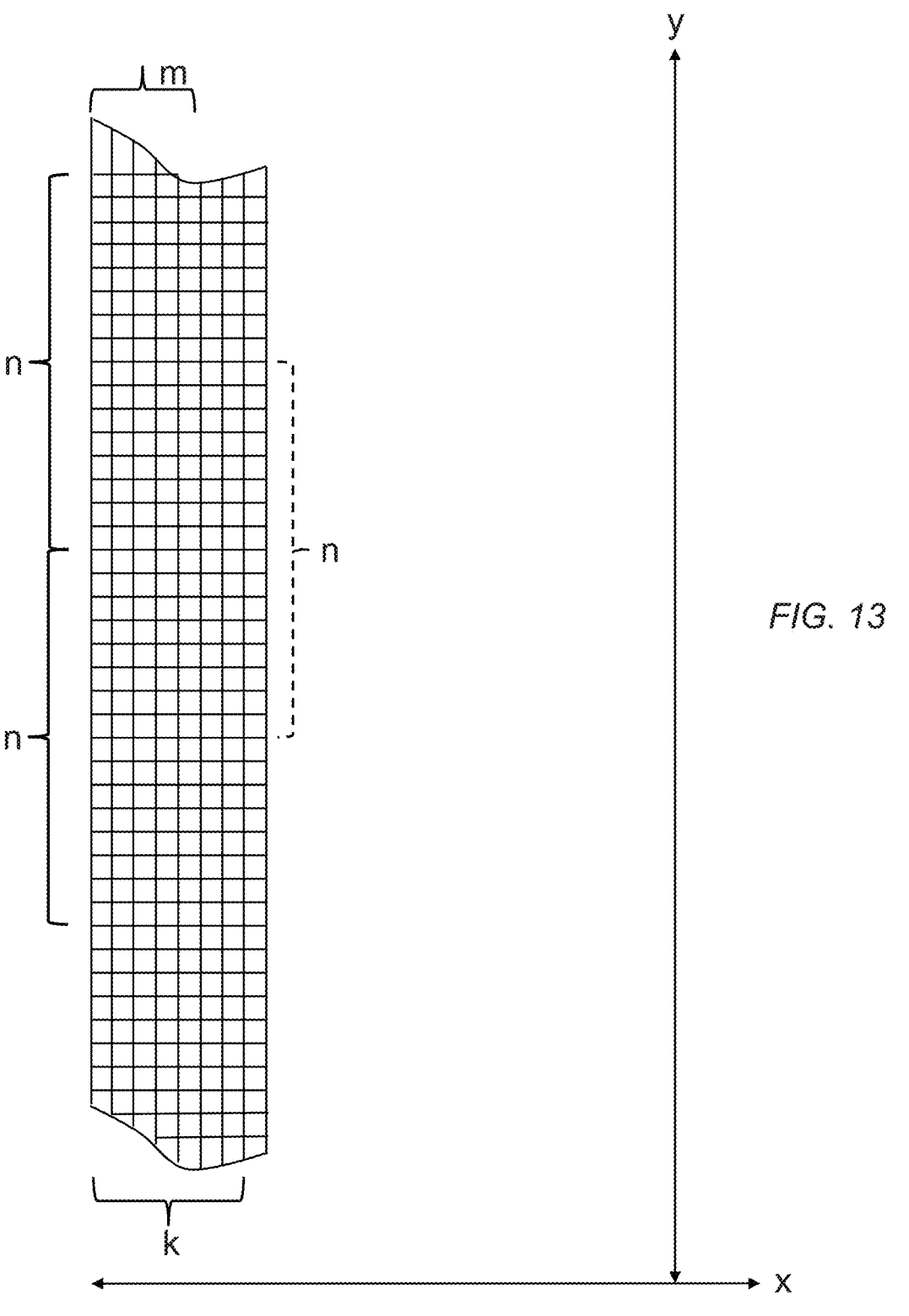
FIG. 13 illustrates the grouping of pixels of an exemplary embodiments of row column filters.

Generally, organizing the pixels for such a filter is illustrated in FIG. 13. An input image frame of pixel values arranged in x columns and y rows is presented to the filter. The filter may be used before, after or within the noise reduction and contrast enhancement filters described above. Although specific numbers and mathematical operations are shown, it is to be understood that the size of the blocks, and the specific types of measures of central tendency (measures), e.g., mean, median, etc., are not critical, and departures from the example shown may be used effectively and fall within the teachings herein.

The columns are divided into blocks of n pixels, for example, as shown in the figure n=16. It is also possible to overlap the blocks, such as shown by the dashed grouping, so that the operations are repeated for each block. A first central density measure CDM is created for each block, in this example embodiment, median, but others are possible. A number of m adjacent rows, in this case 2 on each side or five total, is used, and a second CDM, in this example the average, of the first measures is created. The process is repeated for the entire frame. A column noise correction value, the difference between the two measures is created for each column block, and subtracting the correction value from each corresponding input pixel creates a column noise corrected frame.

It may be desirable to soften the differences between the blocks by interpolating between the correction values in adjacent rows on a pixel-by-pixel basis in each block to further refine the correction value. An example interpolation is a linear interpolation down the column. Edge values may be set to some measure of the edge rows and columns.

Example Column Filter for Removing Short Term Perturbations

An example column filter pf this type is shown in the block diagram of FIG. 14A.

In step 1400, for an array of x columns and y rows, a CDM is calculated for blocks of n pixels in a column. In one example embodiment this CDM may be average. It is also possible to offset the blocks such that each CDM is of overlapping pixels from two overlapped block. The n shown in FIG. 13 is 16, but other numbers, such as 8 for example, are possible.

In step 1410, blocks are grouped in g blocks. In an example embodiment, g is 2, but higher numbers are possible. A second CDM, average for example, is calculated for the groups, generating an array of x by y/(g*n) (or modified n if overlap is used) of local pixels averaged along the vertical column direction.

In step 1420, the resultant CDM's column pixels are grouped in blocks of m across the rows, and a CDM of each row block is calculated. In the example of FIG. 13 m=5.

In step 1430, a Difference is calculated between the CDM of each column block, or group of blocks, and the CDM of each row block on a per pixel basis.

In step 1440, the Difference may be optionally interpolated along the column to smooth out the values. A linear interpolation is one example.

In step 1450, the Difference, or optionally the interpolated Difference, is subtracted from each pixel as a column correction.

A row filter, appropriate for use with the above row filter, may entail creating a first measure of all of the pixels in a row, for example the mean or any other suitable value calculated based on the pixels in the row. The row may be divided into blocks of k pixels, in this case k=7 for example, and a second measure, in this case the median, created for each block. A Difference may be calculated between these two for each pixel. Alternatively, an intermediate correction value may be created by taking the difference of the two measures for each block. A third measure, in this case the mean, may be created for the intermediate values. A row noise correction factor may be created by calculating a Difference between the intermediate value and the third measure for each block. The Difference row noise correction value may be subtracted from each corresponding input pixel for a row noise filtered image frame. The row filter may be used before, after, or independently of the column filter.

Example Row Filter for Removing Short Term Perturbations

FIG. 14B shows the steps involved in a particular embodiment of a row filter of the type described above.

In step 1460 a CDM of each row is calculated. In one example embodiment, the CDM may be an average of pixel values across the row, although any other suitable value calculated based on the values of each row may be used.

In step 1470 the pixels in each row are divided into blocks of k×1, and a CDM of each row block is calculated. In one example embodiment, k is 7, and the CDM is a median or an average of the pixel values in each row block.

In step 1470 a Difference is calculated between the row CDM and the row block CDM for each pixel and subtracted from each pixel as a row correction.

In Step 1480, alternatively, a CDM of the Differences ca be calculated and subtracted from the Differences to create the row correction.

Another approach to improving the visual object recognition of low-contrast scenes is to vary the type of histogram equalization (HE), e.g., the gain per pixel intensity, applied when the image is equalized for display. In a non-equalized image, the camera controller generally assigns the available display levels to the actual pixel intensities in a linear fashion. For many images this is not desirable as display levels will be assigned to intensities (e.g., temperatures) that may not exist in a given scene, and thereby visual contrast of temperatures of interest is not optimized. For a low contrast scene of vary limited temperature range, however, it may be useful to assign display levels to small temperature differences to bring out even small temperature contrasts visually. So a linear equalization may be desirable for low-contrast scenes.

Figure 15A:
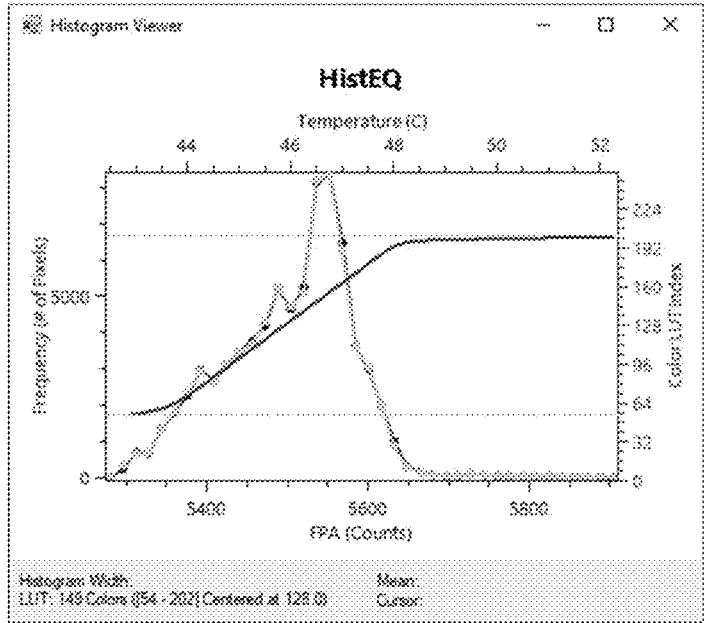
FIGS. 15A, 15B and 15C illustrates exemplary approaches for changing the Histogram Equalization properties depending on the scene contrast.
Figure 15B:
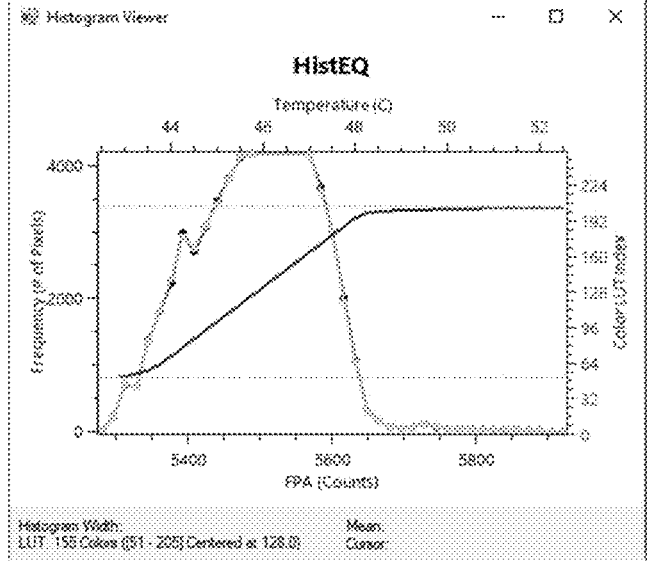
Figure 15C:
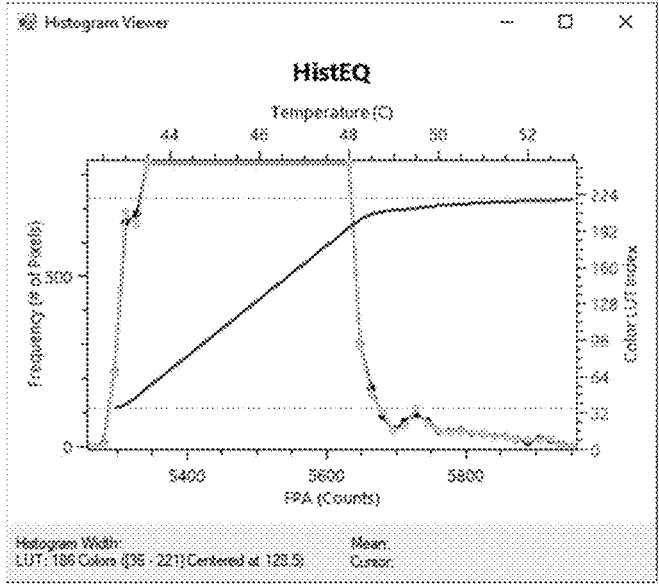

As shown in FIGS. 15A, 15B, and 15C, it is possible to vary the amount of linearity in the equalization. For instance, in the example shown, the amount of clipping of the histogram is linearly varied depending on the histogram width. This results in increased linearity of the equalization depending directly on the width of the histogram. Most image processing suites have such controls on the HE process, but regardless of the actual detailed process used, determining the width of the temperature range is possible, which is directly related to the scene contrast, with lower histogram widths corresponding to lower contrast scenes, and decisions can be made appropriately to optimize the user visual contrast. Such decisions can include the degree of linearity applied to the HE process, as well as which, if any, of the above filters may be used. Generally the width of a histogram of scene intensity values is indicative of the temperature contrast of the scene, with higher widths corresponding to higher contrast. The histogram may be of all pixels in a scene or just a subset of those whose intensities correspond to a temperature range of interest.

Other modifications to the above techniques may be beneficial depending on the contrast of the scene. Such modifications may be enabled by determining the width of the scene temperature histogram, and selecting these modifications by comparing the observed histogram width (e.g., scene contrast) to predetermined values. These predetermined values can vary according to specific imager performance and the judgment of practitioners on the quality of displayed images.

One modification that may be beneficial is, for scenes below a predetermined contrast, performing the steps of the row filter described above on the columns instead of the column filter described above.

Figure 16A:
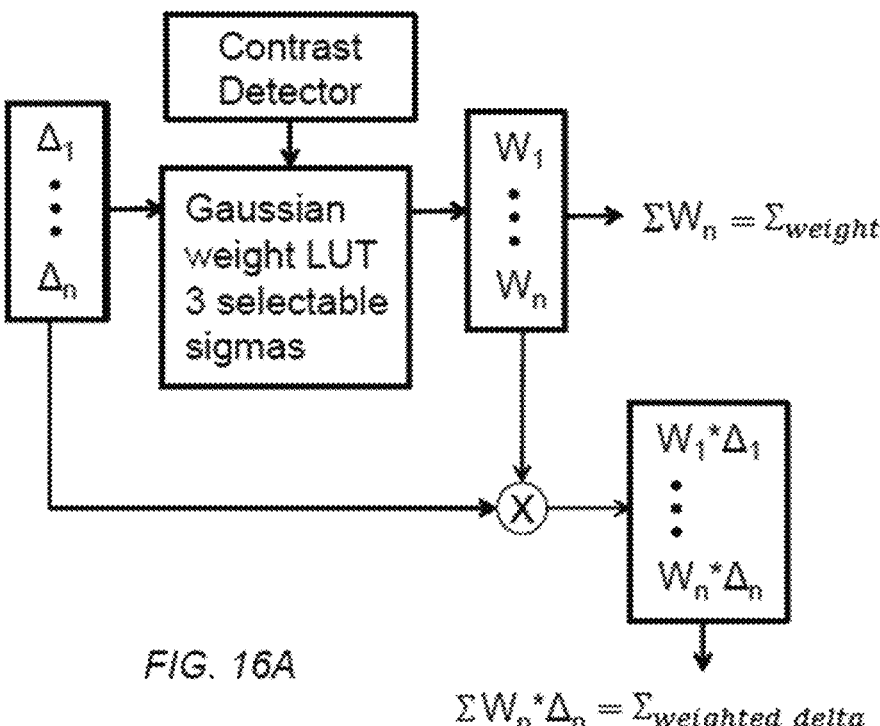
FIGS. 16A and 16B illustrate modifications to the exemplary filters that may be made determined by the scene contrast.
Figure 16B:
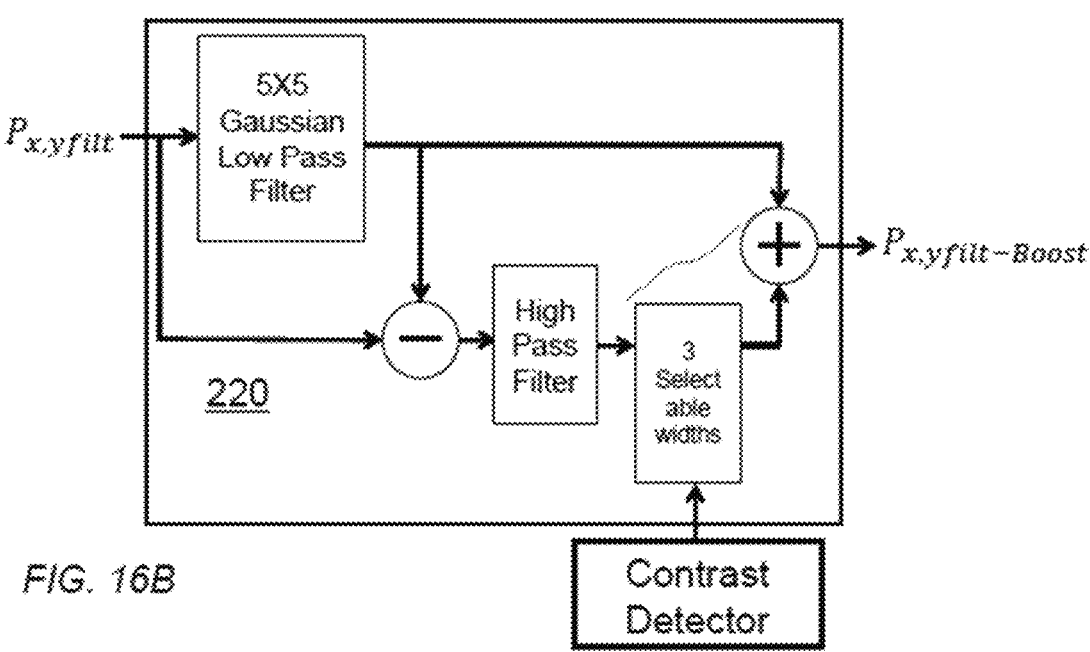

Other modifications are shown in FIGS. 16A and 16B. In FIG. 16A, the results of contrast detection may lead to the selection of varying sigmas for the weight LUT of the noise filter. For instance, LUTs for three different sigmas may be selected based on comparing the observed scene contrast to predetermined values. In FIG. 16B, the width of the gain LUT (e.g., the width of the flat portion of the gain curve) may be varied depending on observed scene contrast detection. Again, for example, one of three different width LUTs may be selected depending on comparing actual scene contrast to predetermined values.

Terminology

Depending on the embodiment, certain acts, events, or functions of any of the processes described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and process steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. For example, the memory elements described herein may be implemented using a discrete memory chip, a portion of memory in a microprocessor, flash, EPROM, various types of RAM, or other types of memory.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. A software module can comprise computer-executable instructions which cause a hardware processor to execute the computer-executable instructions.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, and Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices or processes illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A method for reducing noise in a thermal image in a thermal camera including a thermal imaging sensor, and image processing capability for implementing a signal processing chain of processor executed functions, the method comprising:

receiving partially processed image frame data at a noise reduction filter in the signal processing chain, the partially processed image frame data comprising frames of pixel values; and, for each pixel of a plurality of pixels of the frame:

calculating n delta values for the pixel, each of the delta values comprising a difference between the pixel value of the pixel and the pixel value of a near or nearest neighbor pixel;

deriving, based on a weight look up table (LUT), n weight values each corresponding to one of the n delta values;

summing the n weight values;

deriving n weighted delta values each equal to a product of the corresponding weight and delta values;

summing the n weighted delta values; and passing forward to the signal processing chain a filtered pixel value equal to the received pixel value for the pixel minus a quotient of the sum of the n weighted delta values divided by the sum of the n weight values.

2. The method of claim 1, wherein the weight LUT contains discrete values of a function that yields diminished weight for increasing delta values.

3. The method of claim 2, wherein the function is a gaussian curve centered at a delta of zero.

4. The method of claim 3, further comprising determining a contrast of the scene based on a width of a histogram of the image intensity values of at least one of all or a subset of all pixels in an image frame of the scene; and varying a width of the gaussian curve depending on the width of the histogram.

5. The method of claim 1, further comprising, for each of the plurality of pixels:

applying a low pass filter (LPF) to the pixel to generate a LPF pixel value;

subtracting the LPF pixel value from the received pixel value of the pixel;

applying a high pass filter (HPF) to the LPF pixel value to generate a HPF pixel value;

applying a variable gain to the HPF pixel value according to a gain LUT;

adding the LPF pixel value to the pixel value derived from the gain LUT to derive a feature enhanced pixel value; and passing forward the feature enhanced pixel value to the signal processing chain.

6. The method of claim 5, wherein the gain LUT boosts pixel values with values a predetermined threshold above or below zero and leaves pixel values unchanged if the pixels are within the predetermined threshold of zero.

7. The method of claim 5, wherein the feature enhancement filter follows the noise reduction filter in the signal processing chain.

8. A method for enhancing features in a thermal image in a thermal camera including a thermal imaging sensor, and image processing capability for implementing a signal processing chain of processor executed functions, the method comprising:

receiving a frame of partially processed image frame data comprising pixel values at a feature enhancement filter in the signal processing chain; and, for each pixel of a plurality of pixels of the frame:

applying a low pass filter (LPF) to the pixel to generate a LPF pixel value;

subtracting the LPF pixel value from the received pixel value of the pixel;

applying a high pass filter (HPF) to the LPF pixel value to generate a HPF pixel value;

applying a variable gain to the HPF pixel value according to a gain LUT;

adding the LPF pixel value to the pixel value derived from the gain LUT to derive a feature enhanced pixel value; and passing forward the feature enhanced pixel value to the signal processing chain.

9. The method of claim 8, wherein the gain LUT boosts pixel values with values a predetermined threshold above or below zero and leaves pixel values unchanged if the pixels are within the predetermined threshold of zero.

10. The method of claim 8, further comprising, for each pixel of the plurality of pixels:

calculating n delta values for the pixel, each of the delta values comprising a difference between the pixel value of the pixel and the pixel value of a near or nearest neighbor pixel;

deriving n weight values corresponding to each delta from a weight look up table (LUT);

summing the n weight values;

deriving n weighted delta values each equal to a product of the corresponding weight and delta values;

summing the n weighted delta values; and passing forward to the signal processing chain a filtered pixel value equal to the received pixel value for the pixel minus a quotient of the sum of the n weighted delta values divided by the sum of the n weight values.

11. The method of claim 10, wherein the weight LUT contains discrete values of a function that yields diminished weight for increasing delta values.

12. The method of claim 11, wherein the function is a gaussian curve centered at a delta of zero.

13. The method of claim 12, further comprising determining a contrast of the scene based on a width of a histogram of the image intensity values at least one of all or a subset of pixels in an image frame of the scene; and varying a sigma of the gaussian depending on predetermined values of the contrast.

14. The method of claim 12, further comprising determining a contrast of the scene based on a width of a histogram of the image intensity values of at least one of all or a subset of all pixels in an image frame of the scene; and varying a width of the gain LUT depending on predetermined values of the contrast.

15. The method of claim 10 wherein the feature enhancement filter follows the noise reduction filter in the signal processing chain.

16. The method of claim 10 further comprising:

receiving image frame data at a colorization element and an edge highlighting filter element in the signal processing chain, the image data comprising frames of pixel values;

assigning colors to each pixel corresponding to a predetermined relationship between color and at least one of pixel intensity or scene temperature of the region of the imaged scene corresponding to a given pixel, wherein the colors are assigned from a primary color look up table (LUT);

applying an edge filter to the frame pixels to generate a map of edge strength values of each pixel;

converting the edge strength values to a histogram of discrete edge strength bins comprising a number of edge strength bins corresponding to pixel edge strength above a predetermined value divided into a predetermined number of bins;

creating a series of color LUTs each color LUT in the series comprising a shift in brightness from the primary color LUT, wherein the number of color LUTs corresponds to the predetermined number of bins, and the shift in brightness between each color LUT corresponds to a total desired shift for maximum edge strength divided by the predetermined number of bins; and replacing the colors assigned to individual pixels from the primary color LUT that have a pixel edge strength above the predetermined value, with colors from the shifted LUT corresponding to the individual pixel's edge strength bin.

* * * * *